US005775533A

United States Patent [19]

Schroeder

[11] Patent Number: 5,775,533
[45] Date of Patent: Jul. 7, 1998

[54] APPARATUS FOR DISPENSING SOFT SERVE FROZEN PRODUCT

[75] Inventor: Alfred A. Schroeder, San Antonio, Tex.

[73] Assignee: Lancer Partnership Ltd., San Antonio, Tex.

[21] Appl. No.: 714,020

[22] Filed: Sep. 11, 1996

[51] Int. Cl.[6] .................................................. B65D 35/28
[52] U.S. Cl. .......................... 222/95; 222/105; 222/326; 222/390
[58] Field of Search .................................. 222/390, 105, 222/326, 95, 146.6

[56] References Cited

U.S. PATENT DOCUMENTS

| 5,405,054 | 4/1995 | Thomas . | |
| 5,421,484 | 6/1995 | Beach | 222/95 |
| 5,632,415 | 5/1997 | McGill | 222/95 |

FOREIGN PATENT DOCUMENTS

| 2213532 | 12/1988 | United Kingdom . |
| 2230057 | 3/1990 | United Kingdom . |
| 2234556 | 7/1990 | United Kingdom . |
| 9414333 | 7/1994 | WIPO . |

Primary Examiner—Philippe Derakshani
Attorney, Agent, or Firm—Christopher Makay; Donald Comuzzi

[57] ABSTRACT

An apparatus for dispensing a soft-serve frozen product includes a housing having first and second compartments. A door mounts on the housing in a position over the first compartment. The second compartment houses a refrigeration unit for cooling the first compartment. A sleeve and a block disposed within the first compartment support a soft-serve frozen product container. The soft serve frozen product container includes a body with a head attached at one end. A dispensing system compresses the soft-serve frozen product container to extrude product therefrom. An extendable and retractable tape mounted within the sleeve separates the soft-serve frozen product container from the dispensing system to prevent entanglement of the soft-serve frozen product container with the dispensing system. A lever mounted on the door opens the soft-serve frozen product container, while a switch coupled to the lever activates the dispensing system.

11 Claims, 4 Drawing Sheets

APPARATUS FOR DISPENSING SOFT SERVE FROZEN PRODUCT

BACKGROUND OF THE INVENTION

1. Field of the Invention

The present invention relates to dispensing equipment and, more particularly, but not by way of limitation, to a dispenser for soft serve frozen confections such as ice cream, yogurt, sherbet, and the like.

2. Description of the Related Art.

Soft serve frozen confections have broad customer appeal and are, therefore, widely sold by food service retailers. Soft serve frozen confections are typically dispensed for immediate consumption through extrusion into an edible cone or other suitable container. Proper extrusion requires a dispensing temperature ranging from about 16 degrees Fahrenheit to about 21 degrees Fahrenheit. That temperature range is critical because lower temperatures make extrusion difficult and produce an inferior taste due to the adverse reaction of the taste buds to low temperatures. Conversely, higher temperature ranges result in a low viscosity product and corresponding excessive melting which does not permit later processing (i.e., dipping in chocolate or crushed nutmeats).

Food service retailers often utilize on-site soft serve frozen confection production to ensure the maintenance of a proper dispensing temperature range. Soft serve frozen confection manufacturers ship frozen soft serve confection ingredients to food service retailers as a powder, refrigerated liquid, or in a frozen state. Powdered or frozen ingredients are converted to a liquid state at the site of the food service retailer. For example, ingredients shipped in a frozen state are allowed to thaw, while water is added to the powder. That liquid is then converted to a soft serve frozen confection by an agitated freezing process performed in a soft serve frozen confection dispenser.

Although on-site production performs adequately for the serving of soft serve frozen confections, that method suffers from numerous disadvantages. First, the machinery required for on-site production is complicated and expensive. Second, the scraper blades that agitate the frozen soft serve confection often require sharpening or replacement, and accidental freezing of the machinery is a constant concern. Third, the cost of the electricity utilized to operate the freezing unit is substantial, and special heavy duty wiring is often necessary to handle the power requirements of the freezing unit. Fourth, the agitation process often prevents the addition of extra ingredients such as nutmeats, candies, or fruits to the soft served frozen confection. Fifth, on-site production increases the risk of bacterial contamination because the higher temperatures associated with the liquid utilized in producing the soft served frozen confection supports bacterial growth. That danger is increased by the possibility of improper cleaning which could result in bacterial growth contaminating newly added liquid ingredients. Finally, quality control for on-site producers of soft serve frozen confections is often inferior when compared to a central manufacturer, resulting in uneven product appearance, taste, and form.

In view of the problems associated with on-site production of soft serve frozen confections, the trend in the food service industry is to provide disposable packaging for soft serve frozen confections and dispensers capable of extruding the confection from its packaging. Disposable packaging allows a central manufacturer to produce the soft serve frozen confection for distribution to food service retailers. Disposable packaging thus permits the manufacturer to impose its own quality control, while eliminating expensive on-site production equipment susceptible to the aforementioned disadvantages.

U.K. Patent Nos. 2,213,532; 2,234,556; and 2,230,057 and International Application No. PCT/GB93/02651 disclose dispensers for extruding frozen products from a portable, collapsible container. The dispensers utilize one of a pneumatically, hydraulically, or mechanically driven piston or plunger to compress the container thereby extruding the frozen product. The container includes multiple bellows that form and accordion-like structure. The problem associated with the dispensers is that the container is extremely inefficient. The plunger or piston compresses each bellows of the accordion-like container to extrude frozen product therefrom, however, as the bellows collapse, they trap frozen product resulting in a significant portion of the frozen product remaining in the container. The dispensers are, therefore, inefficient and wasteful of frozen product.

U.S. Pat. No. 5,405,054 discloses a similar frozen confection dispenser. A collapsible bag resides in a sleeve having a pneumatically driven piston. As the piston expands into the sleeve, it compresses the collapsible bag to extrude confection therefrom. The collapsible bag is cylindrical in shape and includes an outlet on one side. The outlet configuration reduces the amount of confection extruded from the collapsible bag because any confection residing above the outlet will not exit even after maximum compression. Furthermore, the outlet configuration requires the sleeve containing the collapsible bag be located vertically within the dispenser. That design significantly reduces the number of dispensing valves positionable on the dispenser. Essentially, the dispenser has limited front door space, and, with the sleeves occupying a majority of that space, the number of dispensing valves is significantly limited. The dispenser of U.S. Pat. No. 5,405,054 is, therefore, inefficient and wasteful of frozen confection.

Accordingly, a soft serve frozen confection dispenser that utilizes a collapsible container without bellows and with its outlet positioned at one end to permit a horizontal configuration will significantly improve over the above-described dispensers.

SUMMARY OF THE INVENTION

In accordance with the objects of the present invention, an apparatus for dispensing a soft-serve frozen product includes a housing having first and second compartments. A door mounts on the housing in a position over the first compartment. The second compartment houses a refrigeration unit for cooling the first compartment. A sleeve and a block disposed within the first compartment support a soft-serve frozen product container. A dispensing system compresses the soft-serve frozen product container to extrude product therefrom. An extendable and retractable tape mounted within the sleeve separates the soft-serve frozen product container from the dispensing system to prevent entanglement of the soft-serve frozen product container with the dispensing system. A lever mounted on the door opens the soft-serve frozen product container, while a switch coupled to the lever activates the dispensing system.

The dispensing system includes a piston mounted within the sleeve and a rack disposed along the inner surface of the sleeve. A pinion gear mounts within the rack and is coupled to the piston. A motor mounted on a sled is coupled to the pinion gear to drive the pinion gear and, thus, the piston which compresses the softserve frozen product container. Alternatively, the dispensing system includes a sled mounted within the sleeve and a rack disposed along the inner surface of the sleeve. A first and a second pinion gear mount within the sled and are coupled to the rack. A gear is coupled to each of the first and second pinion gears. A motor mounts on the sled and is coupled to the gear to drive the gear and, thus, the first and second pinion gears. The first and second pinion gears propel the sled within the sleeve thereby compressing the soft-serve frozen product container.

In accordance with another object of the present invention, a soft-serve frozen product container includes a body having a head connected thereto. The head includes a neck, a spout, and a piston disposed within the spout to control the flow of soft-serve frozen product from the body.

Still other objects, features, and advantages of the present invention will become evident to those of ordinary skill in the art in light of the following.

DETAILED DESCRIPTION OF THE PREFERRED EMBODIMENTS

Figure 1:
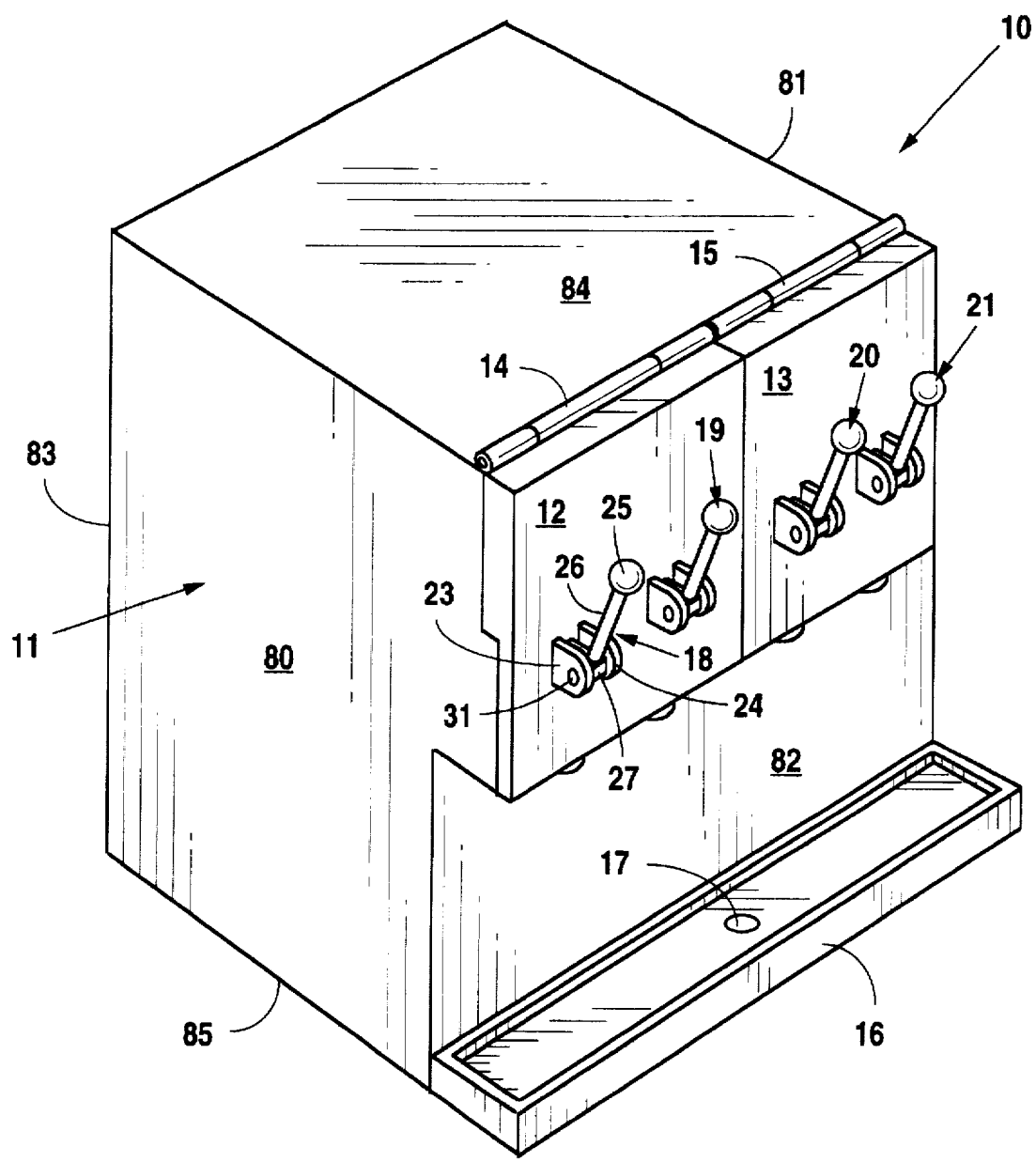
FIGS. 1 and 2 are perspective views illustrating the soft serve frozen product dispenser of the preferred embodiment.
Figure 2:
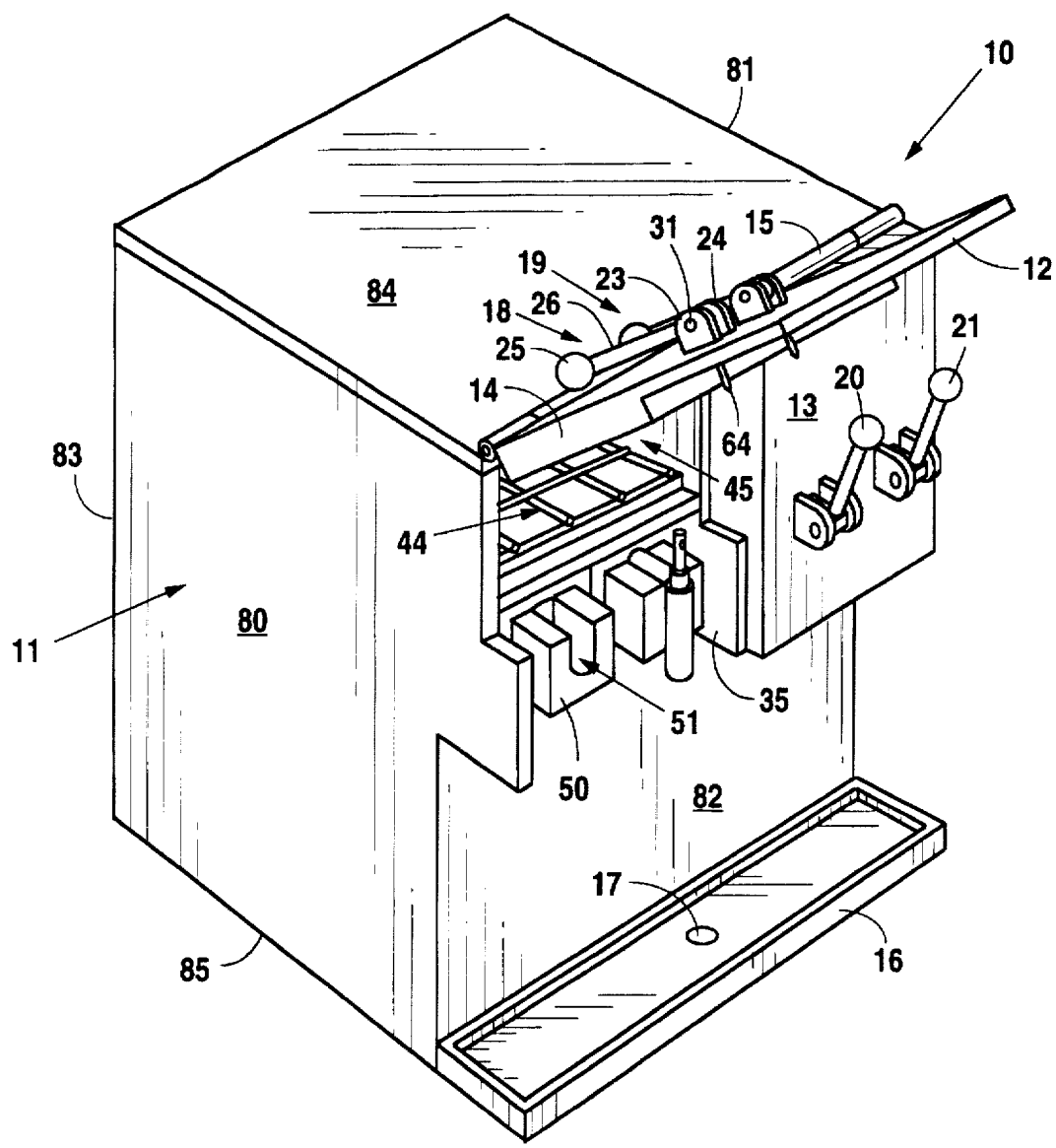

FIGS. 1 and 2 illustrate dispenser 10 for dispensing soft serve frozen product such as ice cream, yogurt, sherbet, and other desert confections. Dispenser 10 includes housing 11 defined by side walls 80 and 81, front wall 82, rear wall 83, top 84, and bottom 85. Side walls 80 and 81, front wall 82, rear wall 83, top 84, and bottom 85 are formed from any suitable material such as sheet metal or aluminum and attached together to define housing 11 using any suitable means such as welding or screws. Partition 30 (see FIG. 4) resides within housing 11 to separate housing 11 into an upper compartment and a lower compartment. Housing 11 further includes partition 35 that separates the upper compartment of housing 11 into compartment 45 and a second compartment adjacent to compartment 45.

Dispenser 10 includes drip tray 16 that mounts to front wall 82 of housing 11 using any suitable means such as nuts and bolts or a bracket that permits easy removal. Drip tray 16 includes drain hole 17 that connects to a drain to allow the removal of spilled product from drip tray 16.

Dispenser 11 includes doors 12 and 13 that pivotally mount to top 84 using hinges 14 and 15. Door 12 supports levers 18 and 19, while door 13 supports levers 20 and 21. Only lever 18 will be described herein because levers 18–21 are identical. Lever 18 includes knob 25, shaft 26, and block 27. Block 27 includes pin 64 and has an opening therethrough. Brackets 23 and 24 mount onto door 12 using any suitable means such as welding. Block 27 fits between brackets 23 and 24, and pin 31 mounts through the opening in block 27 and within brackets 23 and 24 to secure lever 18 to brackets 23 and 24. Pin 31 permits pivotal movement of lever 18 so that lever 18 may be employed as an activation switch for dispenser 10 (described herein).

Dispenser 10 includes a refrigeration unit (not shown) mounted within the lower compartment of housing 11 to provide the cool temperatures required for the dispensing of soft serve frozen product. The refrigeration unit may be of any standard design capable of producing temperatures within the range for soft serve frozen product which is 17 degrees Fahrenheit to 21 degrees Fahrenheit.

Figure 3:
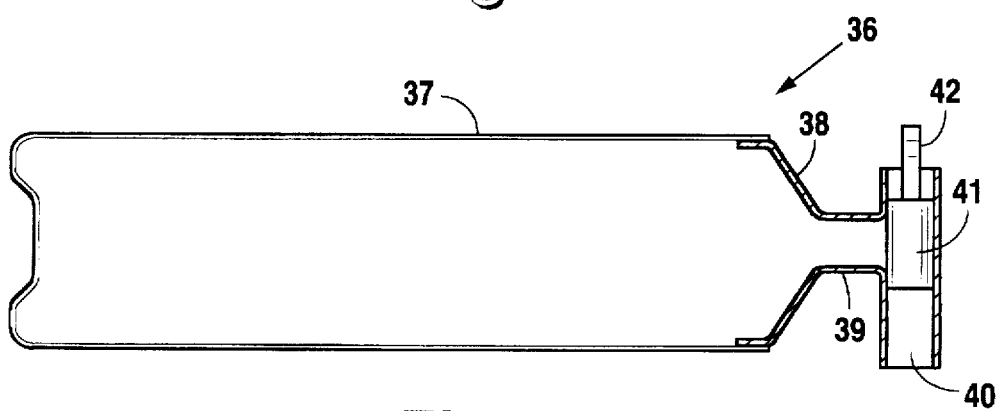
FIG. 3 is a side view in cross-section illustrating the collapsible soft serve frozen product container of the preferred embodiment.

FIG. 3 illustrates soft serve frozen product container 36 which includes body 37 and head 38. Body 37 is any suitable plastics material capable of compression. Conversely, head 38 is constructed from any semi-rigid plastics material. Head 38 includes neck 39 and spout 40. Piston 41 resides within spout 40 to control the flow of product from container 36. Piston 41 includes aperture 42 therethrough to permit the connection of piston 41 to one of levers 18–21. Body 37 attaches to head 38 using any of several well known techniques such as heat sealing or, alternatively, body 37 could include a snap-ring that receives a collar attached to head 38.

Figure 4:
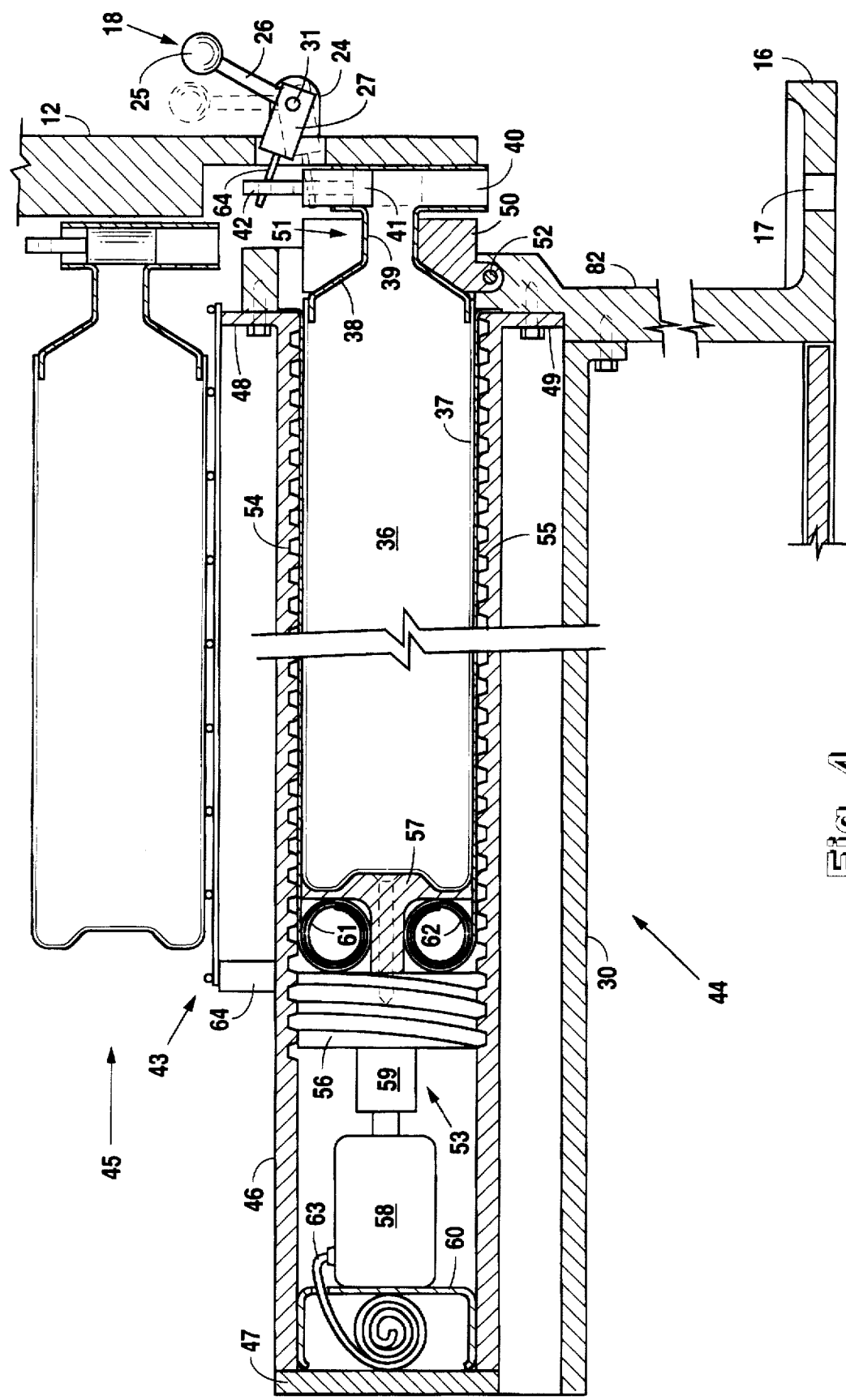
FIG. 4 is a partial side view in cross-section illustrating the dispensing apparatus of the preferred embodiment.

FIG. 4 illustrates a partial cross-sectional side view of compartment 45. Compartment 45 includes tray 43, dispensing system 44, and a second dispensing system adjacent to dispensing system 44. The second dispensing system is not shown and will not be described because it is identical to dispensing system 44. Although not shown and described, the second compartment adjacent to compartment 45 also includes an identical tray and two identical dispensing systems.

Dispensing system 44 includes sleeve 46 which has a closed end 47, block 50 which has groove 51 therein (see FIG. 2), and dispenser drive 53. Sleeve 46 includes flanges 48 and 49 that abut front wall 82 of housing 11 to permit the securing of sleeve 46 thereto using any suitable means such as screws. Block 50 includes groove 51 to support neck 39 of container 36 therein so that block 50 holds container 36 within sleeve 46. Block 50 includes brackets that mount around a protrusion in front wall 82 of housing 11. The protrusion includes an opening therethrough to allow the securing of block 50 thereto using pin 52. Pin 52 permits block 50 to pivot forward so that container 36 may be slid within sleeve 46. Once container 36 is placed in sleeve 46, block 50 is pivoted back to a point where neck 39 of container 36 resides within groove 51 and spout 40 resides in front of block 50.

Dispensing system 44 includes dispenser drive 53 to compress container 36 thereby extruding the soft serve frozen product from within. Sleeve 46 includes racks 54 and 55 that are positioned opposite one another at the upper and lower portions of sleeve 46, respectively. Dispenser drive 53 includes pinion gear 56 which connects to piston 57 using any suitable means such as a screw. Pinion gear 56 engages racks 54 and 55 to transfer the driving force of motor 58 to piston 57, thereby permitting the movement of piston 57 within sleeve 46. Motor 58 connects to pinion gear 56 via shaft 59 and further to sled 60 which engages the inner walls of sleeve 46 to provide a movable mount for motor 58. Motor 58 receives power from any standard source such as a 115/120 VAC line via electrical cord 63. Electrical cord 63 is coiled to permit its unrolling and rolling in accordance with the movements of motor 58.

Dispenser drive 53 includes spring loaded tapes 61 and 62 which, in this preferred embodiment, are constructed from a resilient aluminum material. Due to the soft material of body 37, container 36 would likely catch the teeth of racks 54 and 55 during the forward movement of piston 57. Accordingly, tape 61 covers the teeth of rack 54, while tape 62 covers the teeth of rack 55. Thus, although pinion gear 56 engages racks 54 and 55, tapes 61 and 62 cover the teeth of those racks, respectively, to prevent the snagging of container 36.

Lever 18 functions to open container 36 and to activate motor 58. When door 12 is closed, pin 64 of lever 18 fits within aperture 42 to connect piston 41 to lever 18. Lever 18 includes a switch that opens and closes responsive to the position of lever 18. The switch (not shown) resides within the current path including cord 63 to electrically connect motor 58 with the power source. Thus, when lever 18 is pulled forward, pin 64 pivots to pull piston 41 upward thereby permitting communication between the interior of body 37 and spout 40 via neck 39. Concurrently, the switch closes to active motor 58 which, in turn, drives pinion gear 56 within racks and 54 and 55. Pinion gear 56 pushes piston 57 along sleeve 46 thereby extruding soft frozen confection from container 36 via spout 40. As piston 57 travels within sleeve 46, tapes 61 and 62 rewind to expose additional teeth of racks 54 and 55 to pinion gear 56, while still preventing the snagging of body 37. When lever 18 is returned to its upright position, pin 64 pivots to replace piston 41 in front of neck 39. That movement of lever 18 also deactivates the switch to stop the motion of piston 57 within sleeve 46.

Dispensing system 44 includes a switch (not shown) that is activated to drive motor 58 in reverse. The switch connects motor 58 to the power source with a polarity reversed from that supplied when lever 18 is pulled forward. That reverse polarity voltage drives motor 58 in reverse so that pinion gear 56 travels within racks 54 and 55 rearward toward end 47 to a position that permits the insertion of a new container into sleeve 46. The switch remains depressed until sled 60 contacts end 47 of sleeve 46 whereupon the switch is released because dispenser drive 53 is fully reset. During the resetting of dispenser drive 53, tapes 61 and 62 unwind to cover the teeth of racks 54 and 55, respectively, to prevent the new container from catching during subsequent extrusions of soft serve frozen product.

Compartment 45 includes tray 43 to function as storage for extra containers. Tray 43 is a grate that resides on flange 48, the flange of the dispensing system adjacent to dispensing system 44, and block 64.

Figure 5:
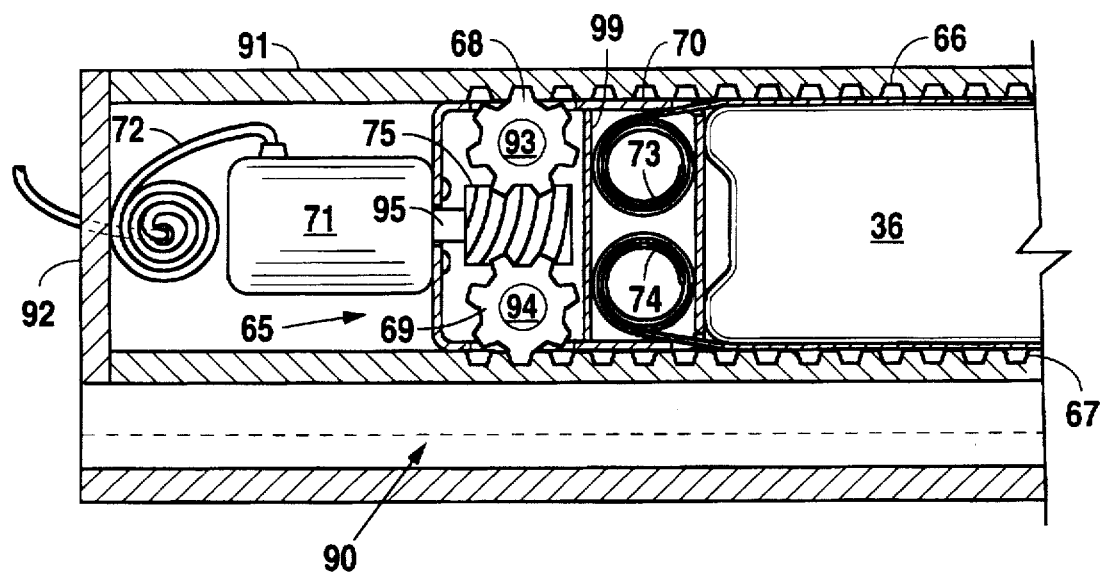
FIG. 5 is a partial side view in cross-section illustrating the dispensing apparatus of an alternative embodiment.

FIG. 5 illustrates an alternative embodiment of the dispensing system. Dispensing system 90 includes sleeve 91 which has a closed end 92, a block identical to block 50 of dispensing system 44, and dispenser drive 65. Sleeve 91 includes flanges that abut front wall 82 of housing 11 to permit the securing of sleeve 91 thereto using any suitable means such as screws. The block includes a groove to support a neck of a container therein so that the block holds the container within sleeve 91. The block includes brackets that mount around a protrusion in front wall 82 of housing 11. The protrusion includes an opening therethrough to allow the securing of the block thereto using a pin. The pin permits the block to pivot forward so that the container may be slid within sleeve 91. Once the container is placed in sleeve 91, the block is pivoted back to a point where the neck of the container resides within the groove and the spout resides in front of the block.

Dispensing system 90 includes dispenser drive 65 to compress the container thereby extruding the soft serve frozen product from within. Sleeve 91 includes racks 66 and 67 that are positioned opposite one another at the upper and lower portions of sleeve 91, respectively. Dispenser drive 65 includes pinion gears 68 and 69 which connect to sled 70 using pins 93 and 94, respectively. Pinion gear 68 engages racks 66 while pinion gear 69 engages rack 67 to transfer the driving force of motor 71 to sled 70, thereby permitting the movement of sled 70 within sleeve 91. Motor 71 connects to sled 70 using any suitable means such as screws. Motor 71 includes shaft 95 having a gear 75 that engages pinion gears 68 and 69 to transfer the driving force of motor 71 to pinion gears 68 and 69. Motor 58 receives power from any standard source such as a 115/120 VAC line via electrical cord 72. Electrical cord 72 is coiled to permit its unrolling and rolling in accordance with the movements of motor 71.

Dispenser drive 65 includes spring loaded tapes 73 and 74 which, in this preferred embodiment, are constructed from a resilient aluminum material. Due to the soft material of its body, the container would likely catch the teeth of racks 66 and 67 during the forward movement of sled 70. Accordingly, tape 73 covers the teeth of rack 66, while tape 74 covers the teeth of rack 67. Thus, although pinion gear 68 engages rack 66 and pinion gear 69 engages rack 67, tapes 73 and 74 cover the teeth of those racks, respectively, to prevent the snagging of the container. Wall 99 resides in sled 70 between gear 75 and pinion gears 68 and 69 and tapes 73 and 74 to prevent the entanglement of tapes 73 and 74 with any one of gear 75 and pinion gears 68 and 69.

Lever 18 functions to open the container and to activate motor 71. When door 12 is closed, pin 64 of lever 18 fits within the aperture of the piston to connect it to lever 18. Lever 18 includes a switch that opens and closes responsive to the position of lever 18. The switch (not shown) resides within the current path including cord 72 to electrically connect motor 71 with the power source. Thus, when lever 18 is pulled forward, pin 64 pivots to pull the piston upward thereby permitting communication between the interior of the container and its spout via its neck. Concurrently, the switch closes to active motor 71 which, in turn, drives pinion gears 68 and 69 within their respective racks and 66 and 67. Pinion gears 68 and 69 drive sled 70 along sleeve 91 thereby extruding soft frozen product from the container via its spout. As sled 70 travels within sleeve 91, tapes 73 and 74 rewind to expose additional teeth of racks 66 and 67 to pinion gears 68 and 69, respectively, while still preventing the snagging of the body of the container. When lever 18 is returned to its upright position, pin 64 pivots to replace the piston in front of the neck of the container. That movement of lever 18 also deactivates the switch to stop the motion of sled 70 within sleeve 91.

Dispensing system 65 includes a switch (not shown) that is activated to drive motor 71 in reverse. The switch connects motor 71 to the power source with a polarity reversed from that supplied when lever 18 is pulled forward. That reverse polarity voltage drives motor 71 in reverse so that pinion gears 68 and 69 travel within their respective racks 66 and 67 rearward toward end 92 to a position that permits the insertion of a new container into sleeve 91. The switch remains depressed until pinion gears 68 and 69 reach the ends of their respective racks 66 and 67 whereupon the switch is released because dispenser drive 65 is fully reset. During the resetting of dispenser drive 65, tapes 73 and 74 unwind to cover the teeth of racks 66 and 67, respectively, to prevent the new container from catching during subsequent extrusions of soft serve frozen product.

Although the present invention has been described as terms of the foregoing embodiment, such description has been for exemplary purposes only and, as will be apparent those of ordinary skills in the art, many alternatives, equivalents, and variations are varying degrees will fall within the scope of the present invention. That scope, accordingly, is not to be limited in any respect by foregoing description, rather, it is defined only by the claims that follow.

What is claimed:

1. An apparatus for dispensing a soft-serve frozen product, comprising:

a housing including first and second compartments;

means disposed within said second compartment for cooling said first compartment;

means disposed within said first compartment for supporting a soft-serve frozen product container;

means for compressing said soft-serve frozen product container to extrude product therefrom; and means for preventing the entanglement of said soft-serve frozen product container with said means for compressing.

2. The apparatus according to claim 1 further comprising a door mounted on said housing in a position over said first compartment.

3. The apparatus according to claim 2 further comprising a lever mounted on said door for opening said soft-serve frozen product container.

4. The apparatus according to claim 3 further comprising a switch coupled to said lever for activating said means for compressing.

5. The apparatus according to claim 1 wherein said means for supporting a soft-serve frozen product container comprises:

a sleeve mounted in said first compartment; and a block pivotably mounted to said housing at the front of said first compartment.

6. The apparatus according to claim 1 wherein said means for compressing comprises:

a piston mounted within said sleeve;

a rack disposed along the inner surface of said sleeve;

a pinion gear mounted within said rack and coupled to said piston; and means for driving said pinion gear.

7. The apparatus according to claim 6 wherein said means for driving said pinion gear comprises:

a sled disposed within said sleeve; and a motor mounted on said sled, said motor coupled to said pinion gear.

8. The apparatus according to claim 6 wherein said means for preventing the entanglement of said soft-serve frozen product container with said means for compressing comprises an extendable and retractable tape mounted within said sleeve between said piston and said pinion gear to separate said soft-serve frozen product container from said rack.

9. The apparatus according to claim 1 wherein said means for compressing comprises:

a sled mounted within said sleeve;

a rack disposed along the inner surface of said sleeve;

a first pinion gear mounted within said sled and coupled to said rack;

a second pinion gear mounted within said sled and coupled to said rack;

a gear coupled to each of said first and second pinion gears; and a motor mounted on said sled and coupled to said gear for driving said first and second pinion gears.

10. The apparatus according to claim 9 wherein said means for preventing the entanglement of said soft-serve frozen product container with said means for compressing comprises an extendable and retractable tape mounted within said sled to separate said soft-serve frozen product container from said rack.

11. The apparatus according to claim 1 wherein said means for preventing the entanglement of said soft-serve frozen product container with said means for compressing comprises an extendable and retractable tape mounted within said means for supporting to separate said soft-serve frozen product container from said means for compressing.

* * * * *